United States Patent
Onishi et al.

(10) Patent No.: US 9,888,195 B2
(45) Date of Patent: Feb. 6, 2018

(54) IMAGING DEVICE, IMAGING SYSTEM, AND DRIVING METHOD OF IMAGING DEVICE

(71) Applicant: CANON KABUSHIKI KAISHA, Tokyo (JP)

(72) Inventors: Tomoya Onishi, Ayase (JP); Shin Kikuchi, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/579,077

(22) Filed: Dec. 22, 2014

(65) Prior Publication Data

US 2015/0181140 A1  Jun. 25, 2015

(30) Foreign Application Priority Data

Dec. 25, 2013 (JP) ................................. 2013-267144

(51) Int. Cl.
*H04N 5/361* (2011.01)
*H04N 5/357* (2011.01)
*H04N 5/374* (2011.01)

(52) U.S. Cl.
CPC ........... *H04N 5/361* (2013.01); *H04N 5/3575* (2013.01); *H04N 5/3742* (2013.01)

(58) Field of Classification Search
CPC ...... H04N 5/361; H04N 5/3745; H04N 5/378; H04N 5/3575; H04N 5/347; H04N 5/3742
See application file for complete search history.

(56) References Cited

U.S. PATENT DOCUMENTS

| | | | | |
|---|---|---|---|---|
| 6,940,059 B2* | 9/2005 | Mabuchi | .............. | H04N 5/3745 250/208.1 |
| 7,154,548 B2* | 12/2006 | Liu | .................. | H01L 27/14609 250/208.1 |
| 7,277,130 B2* | 10/2007 | Korthout | ................ | H04N 3/155 250/208.1 |
| 8,077,227 B2* | 12/2011 | Mo | ...................... | H04N 5/3559 348/241 |
| 8,085,329 B2* | 12/2011 | Kitami | .............. | H04N 5/23245 250/208.1 |
| 8,599,307 B2* | 12/2013 | Solhusvik | ............ | H04N 5/3698 348/294 |
| 8,975,569 B2* | 3/2015 | Yamazaki | .............. | H04N 5/378 250/208.1 |
| 9,124,833 B2* | 9/2015 | Toyoguchi | ........ | H01L 27/14603 |
| 9,204,066 B2* | 12/2015 | Tashiro | ................ | H04N 5/3655 |
| 2003/0183891 A1* | 10/2003 | He | ......................... | H04N 5/361 257/431 |
| 2009/0190005 A1 | 7/2009 | Mo | | |

(Continued)

FOREIGN PATENT DOCUMENTS

| | | | |
|---|---|---|---|
| JP | 2006-108889 A | 4/2006 | |
| JP | 2009-147540 A | 7/2009 | |

(Continued)

*Primary Examiner* — Luong T Nguyen

(74) *Attorney, Agent, or Firm* — Canon USA, Inc., IP Division

(57) ABSTRACT

Provided is an imaging device, an imaging system, and a driving method of the imaging device. A signal of difference between a photogenerated signal of a first pixel which is an effective pixel, and a reference signal of a second pixel which is an effective pixel, is obtained.

9 Claims, 11 Drawing Sheets

(56) References Cited

U.S. PATENT DOCUMENTS

| | | | | |
|---|---|---|---|---|
| 2010/0073538 A1* | 3/2010 | Cieslinski | .............. | H04N 3/155 348/301 |
| 2010/0079646 A1* | 4/2010 | Yin | ................... | H01L 27/14609 348/308 |
| 2012/0286138 A1* | 11/2012 | Yamazaki | .............. | H04N 5/378 250/208.1 |
| 2012/0286139 A1* | 11/2012 | Tashiro | ................ | H04N 5/3655 250/208.1 |

FOREIGN PATENT DOCUMENTS

| | | | |
|---|---|---|---|
| JP | 2010-130317 A | | 6/2010 |
| JP | 2012-253740 | * | 12/2012 |
| JP | 2012-253740 A | | 12/2012 |
| JP | 2013-187744 A | | 9/2013 |

* cited by examiner

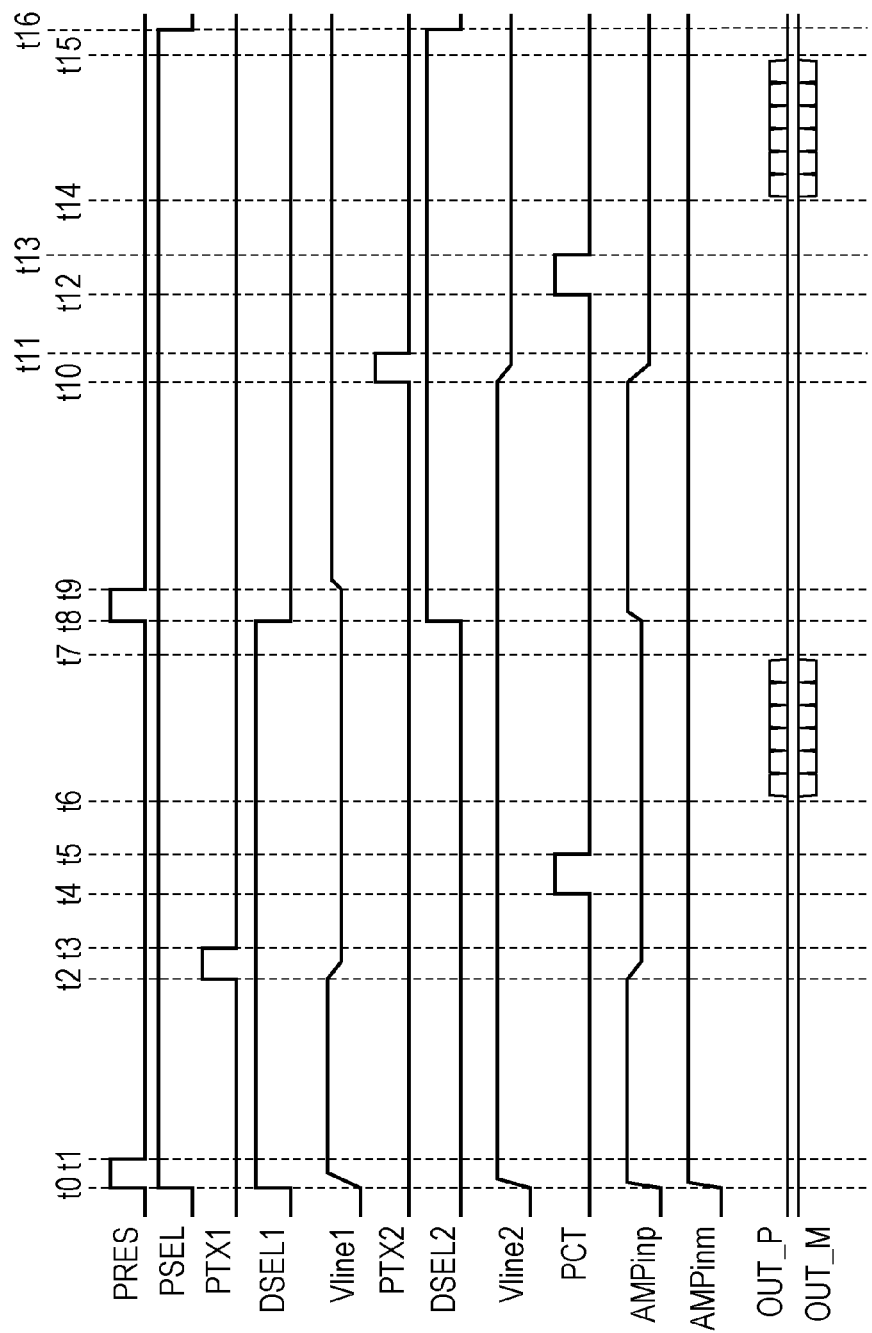

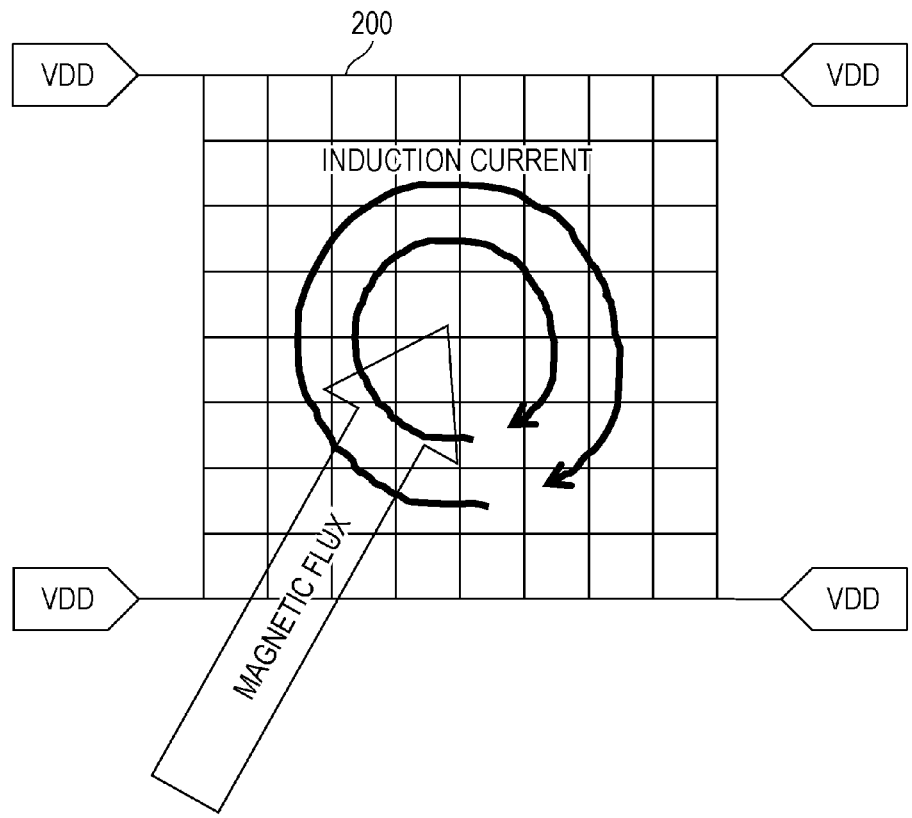
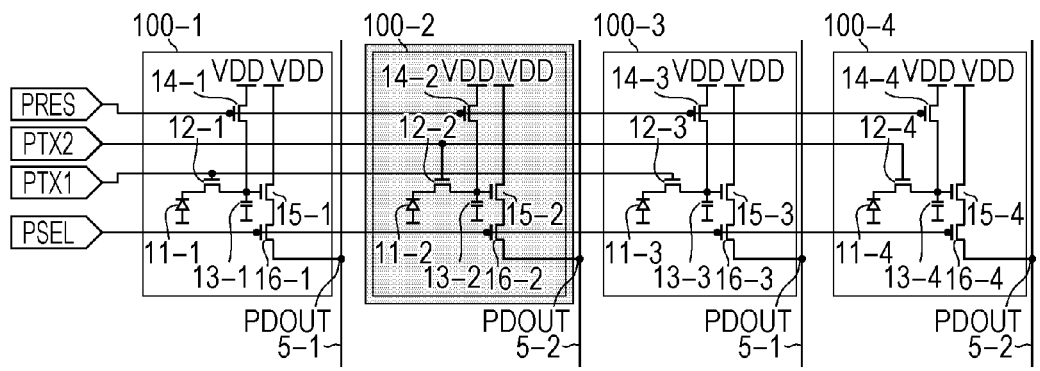

IMAGING DEVICE, IMAGING SYSTEM, AND DRIVING METHOD OF IMAGING DEVICE

BACKGROUND OF THE INVENTION

Field of the Invention

One disclosed aspect of the embodiments relates to an imaging device, an imaging system, and a driving method of imaging device.

Description of the Related Art

Japanese Patent Laid-Open No. 2012-253740 describes a configuration having an effective pixel which performs photoelectric conversion of incident light to generate a charge, transfers the charge to floating diffusion capacitance, and outputs a signal based on the charge held at the floating diffusion capacitance. An imaging device according to Japanese Patent Laid-Open No. 2012-253740 further has a configuration having a reference pixel which outputs a reference signal by applying a reference voltage to floating diffusion capacitance. Japanese Patent Laid-Open No. 2012-253740 also describes an imaging device having an optical black pixel where a photoelectric conversion unit is shielded from light.

The imaging device according to Japanese Patent Laid-Open No. 2012-253740 has a difference signal generating unit which outputs a signal which is the difference between one of a signal output from a reference pixel and optical black pixel, and a signal output from an effective pixel. The signal output by the difference signal generating unit is a signal from which has been subtracted a noise component, included in common in the signal output from the reference pixel or optical black pixel, and the signal output from the effective pixel. Accordingly, the imaging device according to Japanese Patent Laid-Open No. 2012-253740 can output a signal where the noise component has been reduced from the signal output from the effective pixel.

SUMMARY OF THE INVENTION

An imaging device according to one aspect of the disclosure includes a first pixel, a second pixel, and a difference signal generating unit. The first and second pixels each have a photoelectric conversion unit, and each output a reference signal, and a photogenerated signal based on a charge generated at the photoelectric conversion unit. The difference signal generating unit has a first node where the reference signal of one of the first pixel and the second pixel is input, and a second node where the photogenerated signal of the other of the first pixel and the second pixel is input, the difference signal generating unit generating a signal based on a difference between the reference signal and the photogenerated signal that have been input.

According to another aspect of the disclosure, a driving method of an imaging device including a plurality of pixels, each of which include a photoelectric conversion unit, and each output a reference signal, and a photogenerated signal based on a charge generated at the photoelectric conversion unit, includes: one of a first pixel and a second pixel, of the plurality of pixels, outputting the reference signal; the other of the first pixel and the second pixel, of the plurality of pixels, outputting the photogenerated signal; and outputting a signal based on a difference between the reference signal of the one of the first pixel and the second pixel and the photogenerated signal of the other of the first pixel and the second pixel.

Further features of the disclosure will become apparent from the following description of exemplary embodiments with reference to the attached drawings.

BRIEF DESCRIPTION OF THE DRAWINGS

FIG. 3 is a diagram illustrating an example of operation of the imaging device.

FIGS. 4A and 4B are diagrams illustrating voltage variation generated on power source wiring.

DESCRIPTION OF THE EMBODIMENTS

The amount of the noise component due to dark current included in signals of each of an effective pixel and a reference pixel may differ. Accordingly, there have been cases where subtracting a signal output by the reference pixel, from a signal output by an effective pixel, may not accurately reduce noise component of the effective pixel. Also, parasitic capacitance may exist between a shielded portion where the photoelectric conversion unit is shielded from light, and floating diffusion capacitance. In this case, the noise component included in signals output from the effective pixel and the optical black pixel differs. Accordingly, there have been cases where subtracting a signal output by the optical black pixel, from a signal output by the effective pixel, may not accurately reduce noise component in signals output by the effective pixel.

Embodiments described below relate to art which enables noise component to be accurately reduced from signals output from effective pixels. Imaging devices according to the embodiments will be described with reference to the drawings.

First Embodiment

Figure 1:
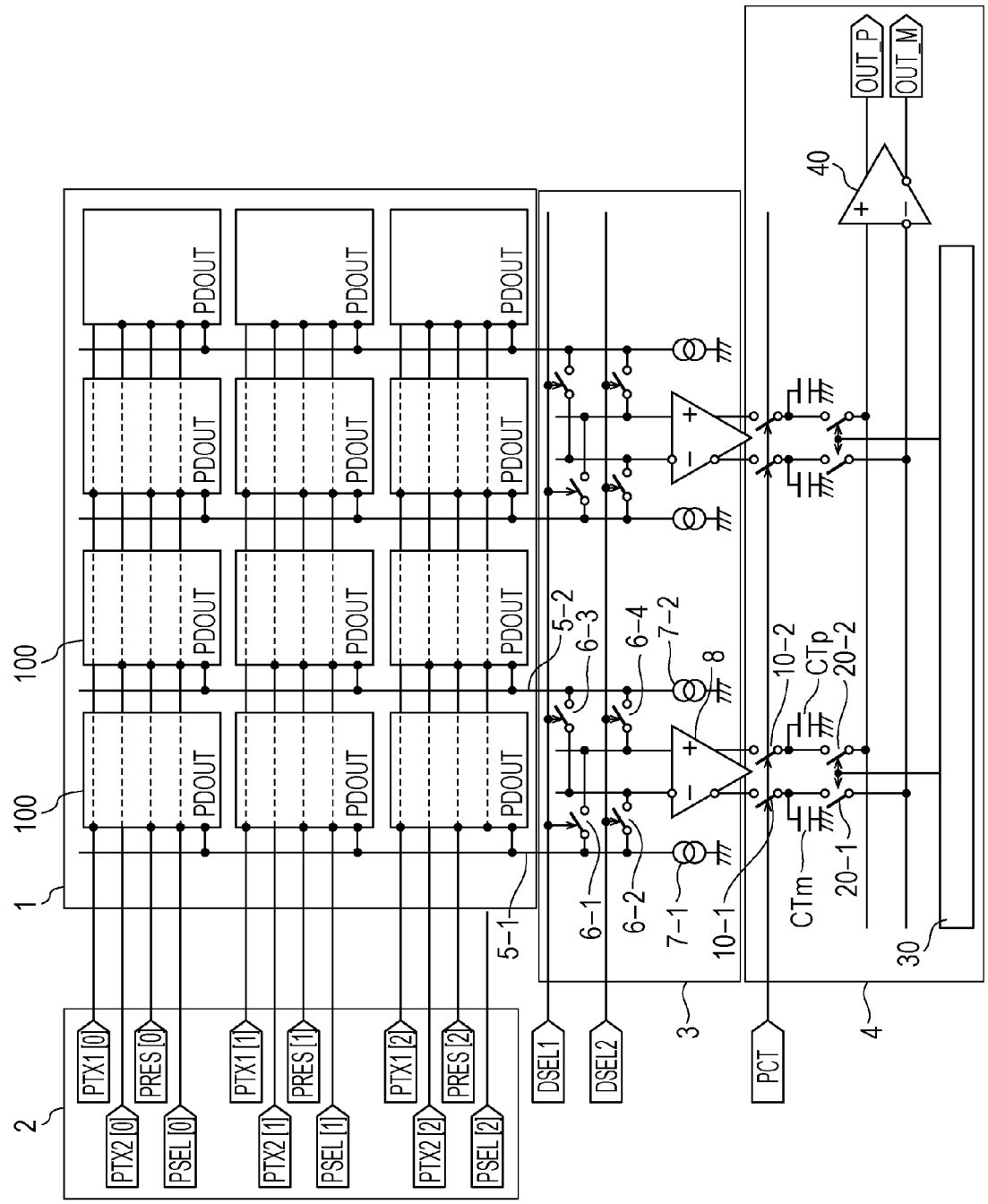
FIG. 1 is a diagram illustrating an example of an imaging device.

FIG. 1 is a block diagram illustrating an example of an imaging device according to a first embodiment. The imaging device according to the present embodiment includes an imaging region 1 having a pixel array where pixels 100 are arrayed in matrix form, a vertical scan circuit 2, a difference signal generating unit 3, and a horizontal transfer unit 4. The pixels 100 each have nodes into which a signal PTX, a signal PRES, and a signal PSEL are input, and a node PDOUT for output of signals. Note that in the present Specification, when referring to pixels 100 and simply stating "M'th row" (where M is an integer of 1 or more), this means the M'th row of the imaging region 1 counted from the end portion opposite to the end portion where the difference signal generating unit 3 is provided. In the same way, when referring to pixels 100 and simply stating "N'th column" (where N is an integer of 1 or more), this means the N'th column of the imaging region 1 counted from the end portion where the vertical scan circuit 2 is provided.

The vertical scan circuit 2 performs vertical scanning which is scanning in row increments of the pixels 100 of the imaging region 1, by controlling the signal levels of the signal PTX1, signal PTX2, signal PRES, and signal PSEL, which are to be supplied to the pixels 100. The vertical scanning by the vertical scan circuit 2 causes the pixels 100 to output each of a photoelectric conversion signal and a reference signal to a vertical signal line 5-1 and a vertical signal line 5-2, from their respective PDOUT terminals. A current source 7-1 supplies current to the pixels 100 via the vertical signal line 5-1. A current source 7-2 supplies current to the pixels 100 via the vertical signal line 5-2.

The difference signal generating unit 3 includes a switch 6-1, a switch 6-2, a switch 6-3, a switch 6-4, and a differential amplifier 8. An unshown timing generator controls the switch 6-1, switch 6-2, switch 6-3, and switch 6-4, to conducting states and non-conducting states, by the signal level of signal DSEL1 and signal DSEL2. The difference signal generating unit 3 outputs signals, obtained by amplifying the signals input from the vertical signal lines 5, to the horizontal transfer unit 4.

The horizontal transfer unit 4 includes a switch 10-1, a switch 10-2, a capacitive element CTm, a capacitive element CTp, a switch 20-1, a switch 20-2, a horizontal scan circuit 30, and an output amplifier 40. An unshown timing generator controls the switch 10-1, and switch 10-2 to conducting states and non-conducting states, by controlling the signal level of signal PCT.

The horizontal scan circuit 30 sequentially controls the conducting state and non-conducting state of the switch 20-1 and switch 20-2, for each column where the differential amplifier 8 has been provided. Accordingly, the horizontal scan circuit 30 performs horizontal scanning which is scanning in column increments of the differential amplifiers 8.

Upon the horizontal scan circuit 30 controlling the switch 20-1 and switch 20-2 to conducting states, signals held in the capacitive element CTm and capacitive element CTp are input to the output amplifier 40. The output amplifier 40 externally outputs signals where the input signals have been amplified, from the imaging device, via a terminal OUT_P and a terminal OUT_M.

Note that FIG. 1 shows reference numerals for members relating to two columns of pixels 100 and one column of differential amplifiers 8. The structures of the members pertaining to the two columns of pixels 100 and one column of differential amplifiers 8 situated to the right thereof are the same as those of the two columns of pixels 100 and one column of differential amplifiers 8 to the left that have been enumerated.

Figure 2:
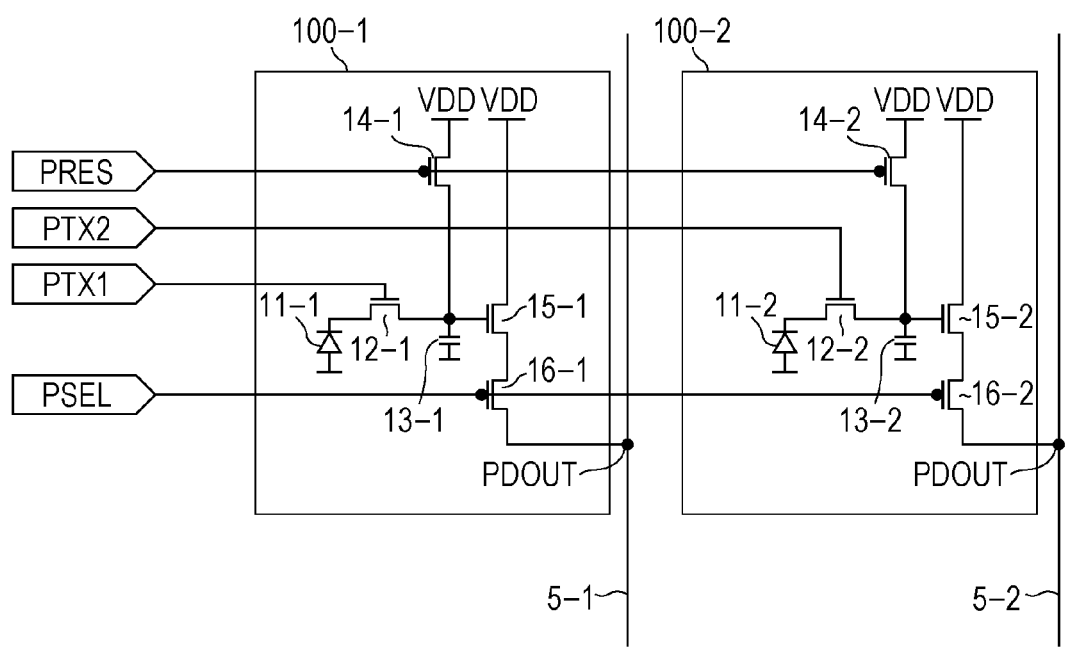
FIG. 2 is a diagram illustrating together an example of a pixel configuration and a vertical scan circuit.

FIG. 2 is a diagram illustrating the configuration of two columns of pixels 100 in more detail. The pixel 100-1 and pixel 100-2 in FIG. 2 are the same except that signals input from the vertical scan circuit 2 by a transistor 12-1 and transistor 12-2 are different. Accordingly, pixel 100-1 will primarily be described here.

The pixel 100-1 includes a photodiode 11-1, the transistor 12-1, a transistor 14-1, a transistor 15-1, a transistor 16-1, and a floating diffusion capacitance 13-1. The photodiode 11-1 is a photoelectric conversion unit which accumulates charge based on incident light. The transistor 12-1 transfers charge accumulated in the photodiode 11-1 to the floating diffusion capacitance 13-1 when the signal PTX1 input from the vertical scan circuit 2 is at High level (hereinafter, "H level"). The input node of the transistor 15-1 is electrically connected to the floating diffusion capacitance 13-1. The transistor 15-1 forms a source follower by bias current being supplied to one main node from the current source 7-1 connected via the vertical signal line 5-1, and power source voltage VDD being supplied to the other main node. The transistor 16-1 outputs the signal output from the transistor 15-1 to the vertical signal line 5-1 when the signal PSEL input from the vertical scan circuit 2 goes to H level. The node where the transistor 16-1 outputs the signal to the vertical signal line 5-1 is the node PDOUT. The signal which the transistor 15-1 outputs is a signal based on the charge held by the floating diffusion capacitance 13-1.

The transistor 14-1 resets the potential of the floating diffusion capacitance 13-1 to potential based on the power source voltage VDD when the signal PRES input from the vertical scan circuit 2 goes to H level. Note that the vertical scan circuit 2 outputs the signal PTX1 to the transistor 12-1 of the pixel 100-1, and the signal PTX2 to the transistor 12-2 of the pixel 100-2.

FIG. 3 is a timing diagram illustrating operations of the imaging device illustrated in FIG. 1. In FIG. 3, Vline1 indicates the potential of the vertical signal line 5-1, and Vline2 indicates the potential of the vertical signal line 5-2. AMPinp in FIG. 3 indicates the potential of the non-inversion input node of the differential amplifier 8 illustrated in FIG. 1, and AMPinm indicates the potential of the inversion input node of the differential amplifier 8 illustrated in FIG. 1. The operations of the imaging device according to the present embodiment will be described with reference to the timing chart in FIG. 3, using the reference numerals in FIGS. 1 and 2.

At time t0, the vertical scan circuit 2 sets the signal PTX1 and signal PTX2 to Low level (hereinafter, "L level"). At time t0, the vertical scan circuit 2 sets the signal PRES to H level. Accordingly, the potential is reset for the floating diffusion capacitance 13-1 and floating diffusion capacitance 13-2 of the pixel 100-1 and pixel 100-2. The vertical scan circuit 2 also sets the signal PSEL to H level at the same time. Accordingly, the transistor 15-1 outputs a signal based on the potential of the floating diffusion capacitance 13-1 that has been reset, to the vertical signal line 5-1 via the transistor 16-1. In the same way, the transistor 15-2 outputs a signal based on the potential of the floating diffusion capacitance 13-2 that has been reset, to the vertical signal line 5-2 via the transistor 16-2. By setting the signal PSEL to H level, the vertical scan circuit 2 selects the pixel 100-1 and pixel 100-2 at the same timing. Accordingly, the period in which the pixel 100-1 outputs a reference signal to the differential amplifier 8 and the period in which the pixel 100-2 outputs a photogenerated signal to the differential amplifier 8 are the same.

Also, at time t0 the unshown timing generator sets the signal DSEL1 to H level. Accordingly, the switch 6-1 and switch 6-3 illustrated in FIG. 1 are in a conducting state. The timing generator also sets the signal DSEL2 to L level. Accordingly, the switch 6-2 and switch 6-4 illustrated in FIG. 1 are in a non-conducting state. Thus, during the period where the signal DSEL1 is H level, the potential AMPinp of the non-inversion input node of the differential amplifier 8 is the potential Vline1 of the vertical signal line 5-1. In the same way, during the period where the signal DSEL1 is H level, the potential AMPinm of the non-inversion input node of the differential amplifier 8 is the potential Vline2 of the vertical signal line 5-2.

At time t1, the vertical scan circuit 2 sets the signal PRES1 to L level, and cancels resetting of the potential of the pixel 100-1, pixel 100-2, floating diffusion capacitance 13-1, and floating diffusion capacitance 13-2. The signal which the transistor 15-1 and transistor 15-2 output at this time will be referred to as "reference signal".

At time t2, the vertical scan circuit 2 sets the signal PTX1 to H level, and thereafter at time t3 the vertical scan circuit 2 sets the signal PTX1 to L level. Accordingly, the transistor 12-1 illustrated in FIG. 2 transfers the charge accumulated in the photodiode 11-1 to the floating diffusion capacitance 13-1. Thus, the transistor 15-1 outputs a signal based on the potential of the floating diffusion capacitance 13-1 to the vertical signal line 5-1 via the transistor 16-1. The signal which the transistor 15-1 outputs here is a signal based on the charge accumulated at the photodiode 11-1. A signal which the transistor 15-1 or transistor 15-2 outputs based on charge accumulated in the photodiode 11-1 or photodiode 11-2 will be referred to as a "photogenerated signal". Note that here, the pixel 100-2 is a first pixel which outputs a reference signal. On the other hand, the pixel 100-1 is a second pixel which outputs a photogenerated signal. Also, the vertical signal line 5-2 is a first vertical signal line which receives input of the reference signal from the pixel 100-2 which is a first pixel. The vertical signal line 5-1 is a second vertical signal line which receives input of the photogenerated signal from the pixel 100-1 which is the second pixel. The transistor 15-1 and transistor 15-2 are both amplification transistors which output photogenerated signals and reference signals. The differential amplifier 8 outputs a signal obtained by amplifying a signal of difference between the photogenerated signal output from the transistor 15-1 and the reference signal output from the transistor 15-2.

At time t4, the timing generator sets the signal PCT to H level. At time t5, the timing generator sets the signal PCT to L level. Accordingly, the capacitive elements CTm and CTp both hold signals which the differential amplifier 8 output at time t5.

At time t6, the horizontal scan circuit 30 puts the switch 20-1 and switch 20-2 in conducting states. Accordingly, signals held by the capacitive element CTm and capacitive element CTp are input to the output amplifier 40. The output amplifier 40 outputs signals based on the capacitive element CTm and capacitive element CTp to the terminal OUT_P and terminal OUT_M. The horizontal scan circuit 30 transfers to the output amplifier 40 the signals held by the capacitive elements CTm and CTp in the period between time t6 to time t7, for each column where the differential amplifier 8 has been provided.

At time t8, the vertical scan circuit 2 sets the signal PRES to H level. Accordingly, the potential of the floating diffusion capacitance 13-1 and floating diffusion capacitance 13-2 is reset. Also, at time t8 the timing generator sets the signal DSEL1 to L level, and sets the signal DSEL2 to H level. Accordingly, the potential AMPinp of the non-inversion input node of the differential amplifier 8 is the potential Vline2 of the vertical signal line 5-2. In the same way, the potential AMPinm of the inversion input node of the differential amplifier 8 is the potential Vline1 of the vertical signal line 5-1.

At time t9, the vertical scan circuit 2 sets the signal PRES to L level. Accordingly, the reset of the floating diffusion capacitance 13-1 and floating diffusion capacitance 13-2 is cancelled. Thus, the transistor 15-1 outputs a reference signal to the vertical signal line 5-1 via the transistor 16-1. In the same way, the transistor 15-2 outputs a reference signal to the vertical signal line 5-2 via the transistor 16-2.

At time t10, the vertical scan circuit 2 sets the signal PTX2 to H level, following which at time t11, the vertical scan circuit 2 sets the signal PTX2 to L level. Accordingly, the transistor 12-2 transfers the charge accumulated in the photodiode 11-2 to the floating diffusion capacitance 13-2. Thus, the transistor 15-2 outputs a photogenerated signal to the vertical signal line 5-2 via the transistor 16-2. Note that here, the pixel 100-1 is a first pixel which outputs a reference signal. On the other hand, the pixel 100-2 is a second pixel which outputs a photogenerated signal. Also here, the vertical signal line 5-1 is a first vertical signal line which receives input of the reference signal from the pixel 100-1 which is the first pixel, and the vertical signal line 5-2 is a second vertical signal line which receives input of the photogenerated signal from the pixel 100-2 which is the second pixel. The differential amplifier 8 outputs a signal obtained by amplifying a signal which is the difference between the photogenerated signal output from the transistor 15-2 and the reference signal output from the transistor 15-1.

At time t12, the timing generator sets the signal PCT to H level. At time t13, the timing generator sets the signal PCT to L level. Accordingly, the capacitive elements CTm and CTp both hold signals which the differential amplifier 8 output at time t13.

During the period of time t14 to time t15, the horizontal scan circuit 30 performs horizontal scanning in the same way as in the period of time t6 to time t7. Accordingly, the output amplifier 40 sequentially outputs the signals based on signals held by the capacitive elements CTm and CTp for each column where the differential amplifier 8 has been provided, to terminal OUT_M and terminal OUT_P.

Thus, according to the imaging device of the present embodiment, the differential amplifier 8 outputs signals of difference between one photogenerated signal from the pixel 100-1 and pixel 100-2 which are effective pixels, and the reference signal from the other. Accordingly, the noise component included in the photogenerated signal can be accurately subtracted, as compared to a case of obtaining a signal of the difference between the photogenerated signals of a reference pixel or optical black pixel, and an effective pixel.

The following is a description of an example whereby the noise component included in both the photogenerated signal and reference signal can be further reduced in the imaging device of the present embodiment. FIG. 4A is a schematic diagram for describing noise generated by a magnetic field fluctuating in the operating environment of the imaging.

The power source voltage VDD which supplies potential to the pixels 100 supplies the pixels 100 in a lattice form in common by power source wiring 200. Assuming now that a magnetic flux due to fluctuation in an external magnetic field outside of the imaging device passes through the power source wiring 200, electromotive force is generated at the power source wiring 200 due to the change in magnetic flux. Accordingly, an eddy current flows on the power source wiring 200. The eddy current flowing on the power source wiring 200 causes fluctuation in the power source voltage VDD. However, the parasitic resistance and parasitic capacitance of the electrical path where the eddy current flows is not uniform on the power source wiring 200. Also, the amount of electromotive force generated depends on the location on the power source wiring 200. Due to these reasons, there are variations in the fluctuation of the power source voltage VDD depending on the location on the power source wiring 200. Thus, the amount of fluctuation of the power source voltage VDD varies between the reference pixels outside of the effective pixel region and the effective pixels. Accordingly, there is variation in the amount of noise component included in the signals output from the reference pixels and the signals output from the effective pixels. Accordingly, in a configuration where the difference between reference pixels outside of the effective pixel region and effective pixels, such as in Japanese Patent Laid-Open No. 2012-253740, the accuracy in reducing noise component included in signals output by the effective pixels is poor.

On the other hand, the differential amplifier 8 of the imaging device according to the present embodiment outputs a signal obtained by amplifying a signal of difference between a photogenerated signal and a reference signals of a pixel 100 near the pixel 100 outputting this photogenerated signal, as described above. Accordingly, the imaging device according to the present embodiment more readily can match the fluctuation amount of the power source voltage VDD for the pixel 100 outputting the reference signal used to obtain the difference as to the photogenerated signal, and the pixel 100 outputting the photogenerated signal, as compared to the configuration described in Japanese Patent Laid-Open No. 2012-253740. Thus, the imaging device according to the present embodiment more readily align the noise component among signals input to the differential amplifier 8, as compared to the configuration described in Japanese Patent Laid-Open No. 2012-253740. Accordingly, the imaging device according to the present embodiment can improve the accuracy in reducing noise component included in the photogenerated signal as compared to the configuration described in Japanese Patent Laid-Open No. 2012-253740.

Figure 8:
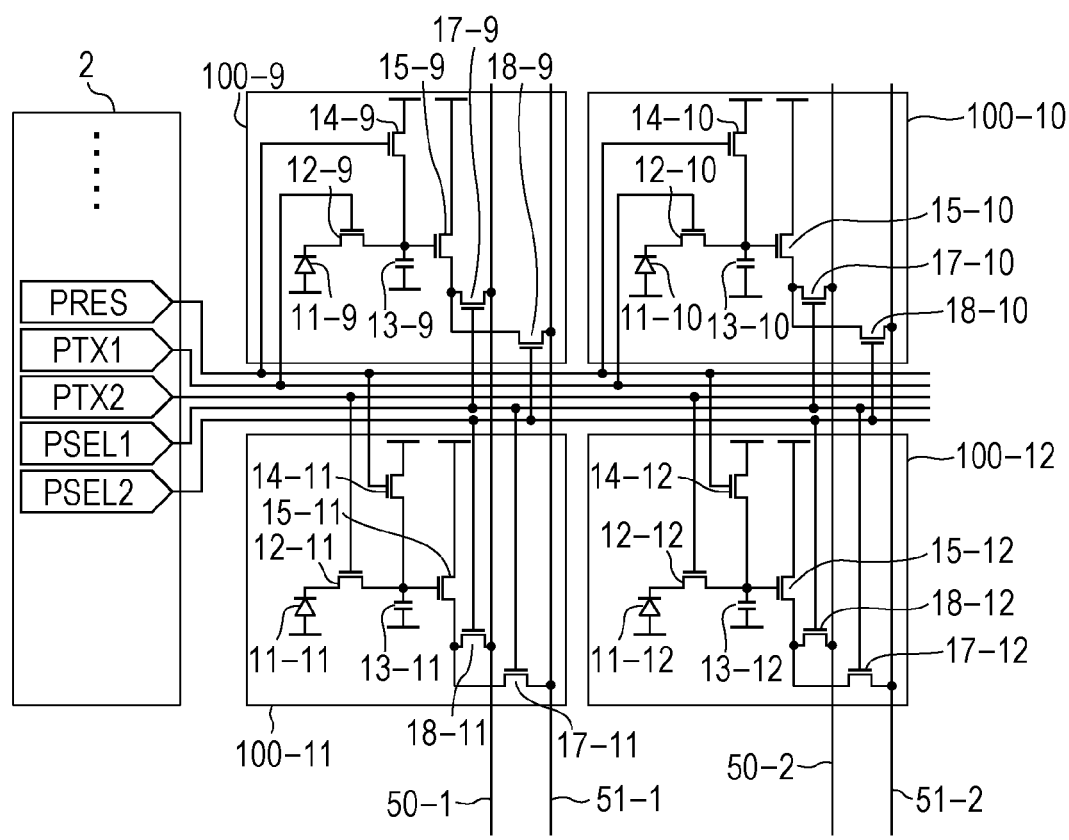
FIG. 8 is a diagram illustrating together an example of the configuration of pixels and a vertical scan circuit.
Figure 9:
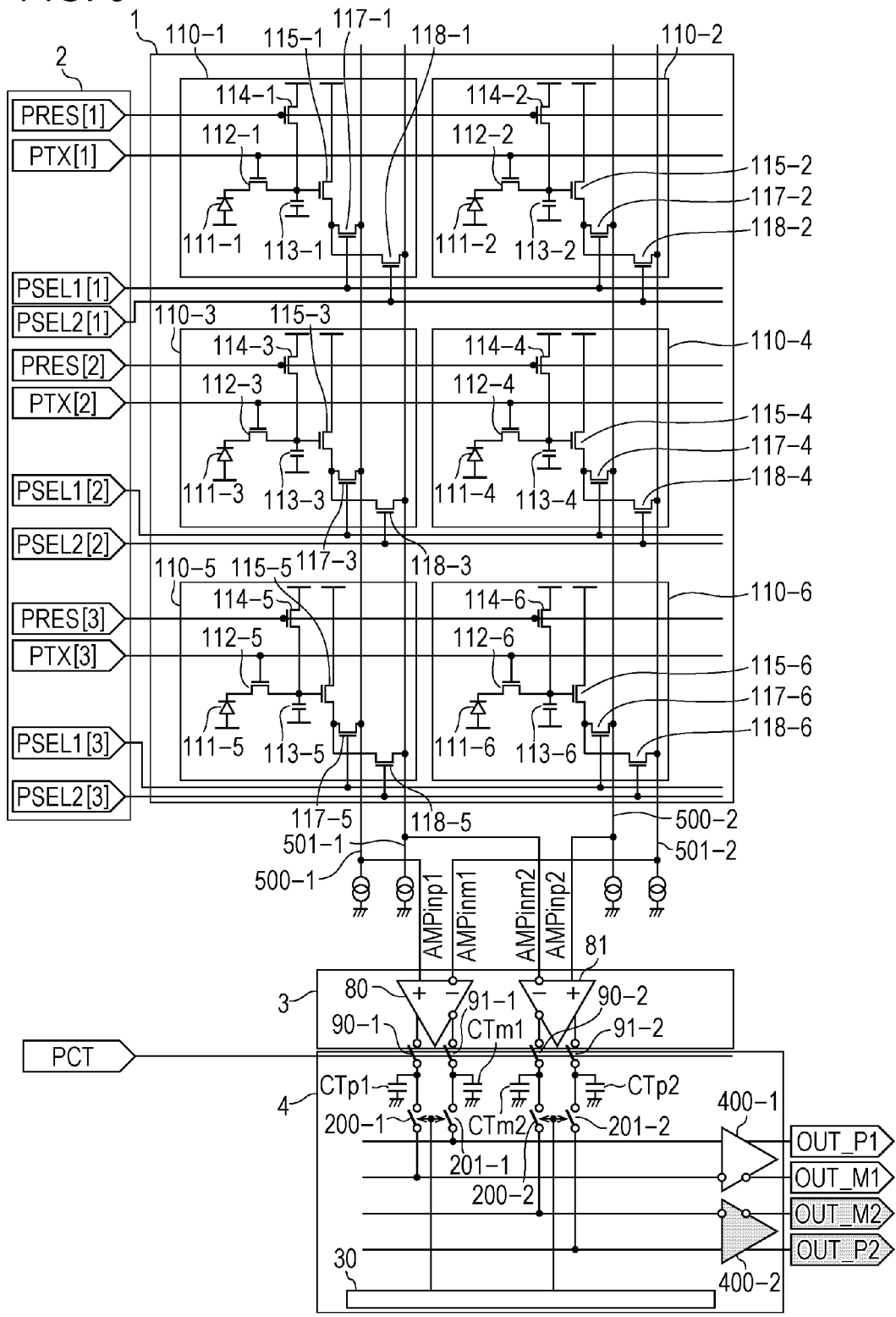
FIG. 9 is a diagram illustrating an example of the configuration of the imaging device.

An example has been described regarding the present embodiment where the difference signal generating unit 3, which obtains difference between a photogenerated signal output by a pixel 100 and a reference signal of a pixel 100 other than the pixel 100 which outputs the photogenerated signal, has the differential amplifier 8. Other configurations may be made, such as an arrangement using an analog-digital conversion circuit such as illustrated in FIGS. 8 and 9 of Japanese Patent Laid-Open No. 2012-253740, and the difference may be output as a digital signal.

The entire period where one of the first pixel and the second pixel outputs a reference signal to the differential amplifier 8, and the entire period where the other of the first pixel and the second pixel outputs a photogenerated signal to the differential amplifier 8 do not have to agree. That is to say, it is sufficient for at least part of the period where one of the first pixel and the second pixel outputs a reference signal to the differential amplifier 8, and the period where the other of the first pixel and the second pixel outputs a photogenerated signal to the differential amplifier 8 to overlap.

Also, an example has been described regarding the present embodiment where the first pixel outputting the reference signal and the second pixel outputting the photogenerated signal are adjacent. However, the present embodiment is not restricted to an example where the first pixel outputting the reference signal and the second pixel outputting the photogenerated signal are adjacent. It is preferable that the distance between the first pixel and second pixel is such that the number of pixels between the first pixel and second pixel is within ten. The number of pixels between the first pixel and second pixel is obtained by connecting the center of gravity of the first pixel and second pixel by a straight line, and counting the number of pixels which the line passes through.

Another advantage of the imaging device according to the present embodiment will be described. FIG. 4B illustrates four columns of pixels, as pixel 100-1, pixel 100-2, pixel 100-3, and pixel 100-4. The pixel 100-3 has the same configuration as the pixel 100-1, and the pixel 100-4 has the same configuration as the pixel 100-2. FIG. 4B illustrates that intense light is being input to the pixel 100-2. Upon the vertical scan circuit 2 setting the signal PTX2 to H level, the charges accumulated at the photodiode 11-1 and photodiode 11-3 of the pixel 100-1 and pixel 100-3 are respectively transferred to the floating diffusion capacitance 13-1 and floating diffusion capacitance 13-3. Intense light is being input to the photodiode 11-2, so the potential of the input node of the transistor 15-2 fluctuates greatly. The great fluctuation in potential of the input node of the transistor 15-2 is transmitted to the control line transmitting the signal PTX2 (hereinafter referred to as "PTX2 line") via the parasitic capacitance of the transistor 12-2. In a case where the PTX2 line and the control line transmitting the signal PTX1 (hereinafter referred to as "PTX1 line") are provided nearby each other, the voltage fluctuation on the PTX2 line is transmitted to the PTX1 line by inter-wire coupling capacitance between the PTX1 line and the PTX2 line. The voltage fluctuation on the PTX1 line may cause the potential of the transistor 15-1 to fluctuate via the transistor 12-1 of the pixel 100-1. In such a case, the effects of voltage fluctuation on the PTX1 line and the PTX2 line can be removed in the imaging device according to the present embodiment by obtaining a signal of difference between the reference signal at the pixel 100-1 and the photogenerated signal at the pixel 100-2.

Second Embodiment

Figure 5:
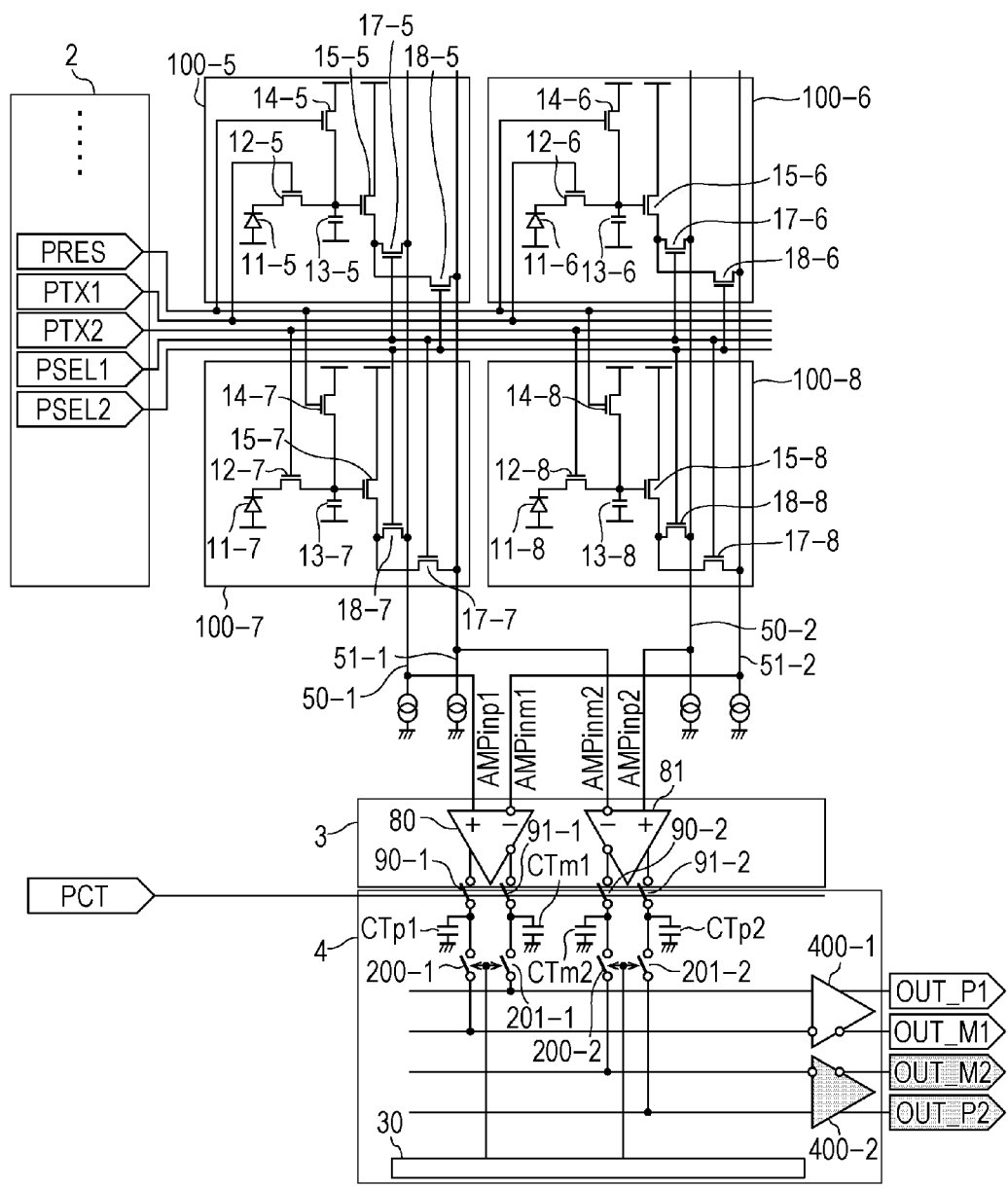
FIG. 5 is a diagram illustrating an example of the configuration of the imaging device.

A second embodiment will now be described. Description of the imaging device according to the present embodiment will center on differences from the first embodiment. FIG. 5 is a diagram illustrating the configuration of the imaging device according to the present embodiment. FIG. 5 illustrates a pixel 100-5, pixel 100-6, pixel 100-7, and pixel 100-8, arrayed in a two-row two-column form. Parts in FIG. 5 which have the same function as those illustrated in FIG. 2 are denoted with the same reference numerals as those used in FIG. 2.

In the present embodiment, the pixel 100 outputting the photogenerated signal and the pixel 100 outputting the reference signals to obtain the difference as to this photogenerated signal are in a diagonal positional relationship. That is to say, in a case where the pixel 100-5 outputs the photogenerated signal, the pixel 100-8 outputs the reference signals to obtain the difference as to this photogenerated signal. In the same way, in a case where the pixel 100-6 outputs the photogenerated signal, the pixel 100-7 outputs the reference signals to obtain the difference as to this photogenerated signal. In a case where the pixel 100-7 outputs the photogenerated signal, the pixel 100-6 outputs the reference signals to obtain the difference as to this photogenerated signal, and in a case where the pixel 100-8 outputs the photogenerated signal, the pixel 100-5 outputs the reference signals to obtain the difference as to this photogenerated signal. The first pixel which is a pixel outputting the reference signal, and the second signal which is a pixel outputting the photogenerated signal belong to different columns and different rows in the present embodiment.

While one vertical signal line 5 is described as being provided for each column of pixels 100 in the first embodiment, two vertical signal lines 50 and 51 are provided for each column of pixels 100 in the present embodiment. Vertical signal line 50-1 and vertical signal line 51-1 are provided corresponding to the column where the pixel 100-5 and pixel 100-7 are provided. Vertical signal line 50-2 and vertical signal line 51-2 are provided corresponding to the column where the pixel 100-6 and pixel 100-8 are provided. While the transistor 15 has been described in the first embodiment as being electrically connected to the vertical signal line 5 via the transistor 16, in the present embodiment the transistor 15 is electrically connected to the vertical signal line 50 via one of transistors 17 and 18, and is electrically connected to the vertical signal line 51 via the other of transistors 17 and 18.

The signal PRES which the vertical scan circuit 2 outputs is input in common to the transistors 14 of the pixel 100-5, pixel 100-6, pixel 100-7, and pixel 100-8. The signal PTX1 which the vertical scan circuit 2 outputs is input in common to the transistors 12 of the pixel 100-5 and pixel 100-6. The signal PTX2 which the vertical scan circuit 2 outputs is input in common to the transistors 12 of the pixel 100-7 and pixel 100-8. The signal PSEL1 which the vertical scan circuit 2 outputs is input in common to the transistors 17 of the pixel 100-5, pixel 100-6, pixel 100-7, and pixel 100-8. The signal PSEL2 which the vertical scan circuit 2 outputs is input in common to the transistors 18 of the pixel 100-5, pixel 100-6, pixel 100-7, and pixel 100-8.

The potential of the vertical signal line 50-1 is input to the non-inversion input node of a differential amplifier 80. The potential of the vertical signal line 51-1 is input to the inversion input node of a differential amplifier 81. The potential of a vertical signal line 50-2 is input to the non-inversion input node of a differential amplifier 80. The potential of a vertical signal line 51-1 is input to the inversion input node of the differential amplifier 81.

Upon the timing generator setting the signal PCT to H level, a switch 90-1, switch 91-1, switch 90-2, and switch 91-2 are placed in a conducting state. Accordingly, a capacitive element CTp1 and capacitive element CTm1 hold the signal output from differential amplifier 80. In the same way, a capacitive element CTp2 and capacitive element CTm2 hold the signal output from differential amplifier 81.

Upon the horizontal scan circuit 30 placing a switch 200-1 and switch 201-1 in a conducting state, the signals held by the capacitive element CTp1 and capacitive element CTm1 are input to an output amplifier 400-1. The output amplifier 400-1 outputs signals obtained by amplifying the signals held by the capacitive element CTp1 and capacitive element CTm1 to a terminal OUT_P1 and terminal OUT_M1.

Upon the horizontal scan circuit 30 placing a switch 200-2 and switch 201-2 in a conducting state, the signals held by the capacitive element CTp2 and capacitive element CTm2 are input to an output amplifier 400-2. The output amplifier 400-2 outputs signals obtained by amplifying the signals held by the capacitive element CTp2 and capacitive element CTm2 to a terminal OUT_P2 and terminal OUT_M2.

Figure 6:
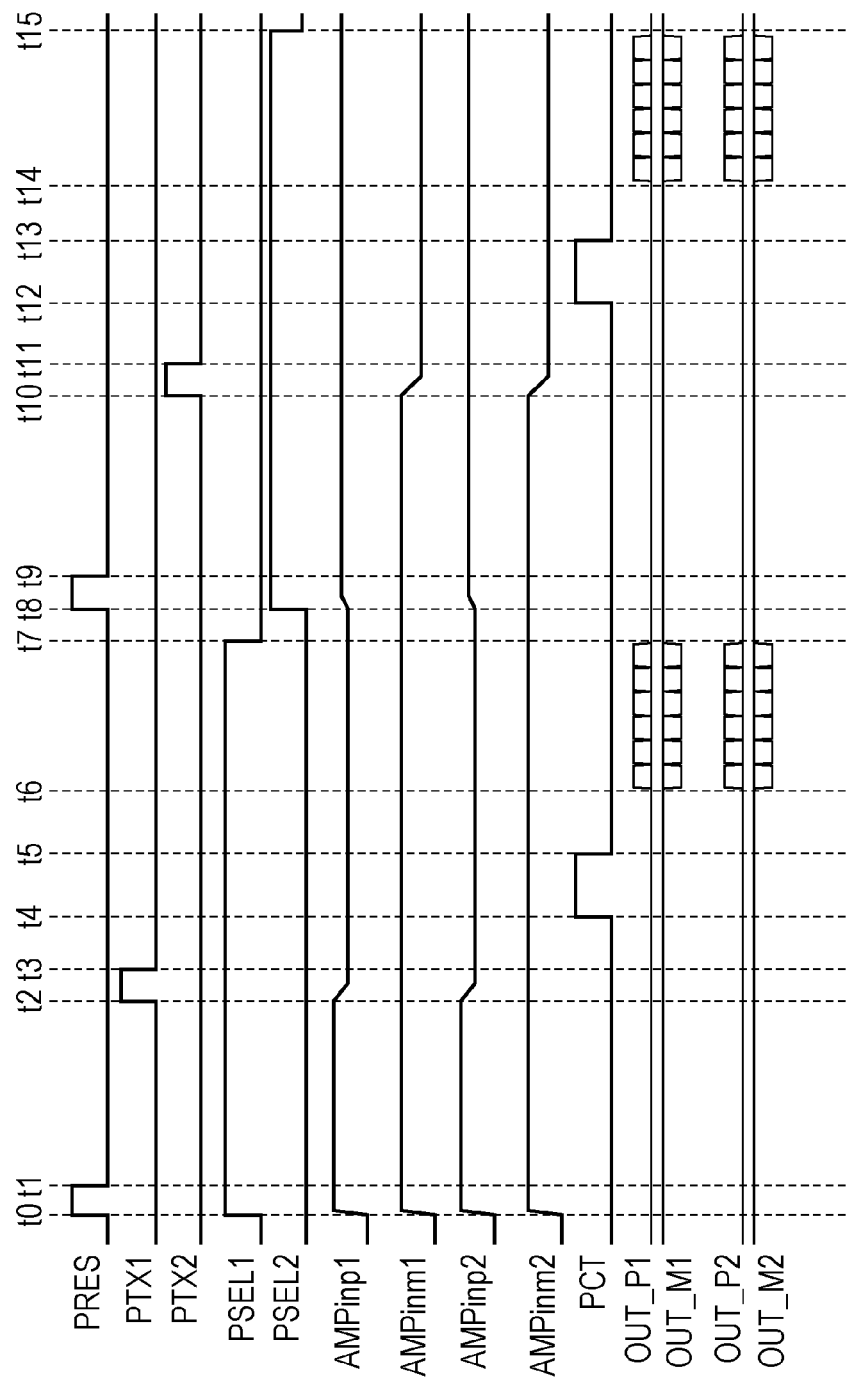
FIG. 6 is a diagram illustrating an example of operation of the imaging device.

FIG. 6 is a timing chart illustrating the operations of the imaging device illustrated in FIG. 5. The AMPinp1, AMPinm1, AMPinp2, and AMPinm2, illustrated in FIG. 6, are the potential of the non-inversion input node and inversion input node of the differential amplifier 80 and the non-inversion input node and inversion input node of the differential amplifier 81, in that order.

At time t0 the vertical scan circuit 2 sets the signal PRES to H level. Accordingly, the potential is reset for the floating diffusion capacitance 13-5, floating diffusion capacitance 13-6, floating diffusion capacitance 13-7, and floating diffusion capacitance 13-8. Also, the vertical scan circuit 2 sets the signal PSEL1 to H level. Accordingly, the transistors 17 of the pixels 100 are in a conducting state. Accordingly, the transistor 15-5 outputs a signal to the vertical signal line 50-1 via the transistor 17-5. Also, the transistor 15-6 outputs a signal to the vertical signal line 50-2 via the transistor 17-6. Further, the transistor 15-7 outputs a signal to the vertical signal line 51-1 via the transistor 17-7, and the transistor 15-8 outputs a signal to the vertical signal line 51-2 via the transistor 17-8.

At time t1, the vertical scan circuit 2 sets the signal PRES to L level. Accordingly, resetting of the potential of the floating diffusion capacitance 13-5, floating diffusion capacitance 13-6, floating diffusion capacitance 13-7, and floating diffusion capacitance 13-8 is cancelled.

At time t2, the vertical scan circuit 2 sets the signal PTX1 to H level, and the at time t3 sets the signal PTX1 to L level. Accordingly, the transistor 17-5 of the pixel 100-5 outputs a photogenerated signal to the vertical signal line 50-1. Also, the transistor 17-6 of the pixel 100-6 outputs a photogenerated signal to the vertical signal line 50-2. Here, the pixel 100-7 and pixel 100-8 are each the first pixel outputting reference signals. On the other hand, the pixel 100-5 and pixel 100-6 are each the second pixel outputting photogenerated signals. Also here, the vertical signal line 51-1 and vertical signal line 51-2 are the first vertical signal line where reference signals are input from each of the pixel 100-7 and pixel 100-8 which are the first pixel. The vertical signal line 50-1 and vertical signal line 50-1 are the second vertical signal line where photogenerated signals are input from each of the pixel 100-5 and pixel 100-6 which are the second pixel.

The differential amplifier 80 outputs a signal obtained by amplifying the signal of difference between the photogenerated signal input from the pixel 100-5 and the reference signal input from the pixel 100-8. Also, the differential amplifier 81 outputs a signal obtained by amplifying the signal of difference between the photogenerated signal input from the pixel 100-6 and the reference signal input from the pixel 100-7.

At time t4, the timing generator sets the signal PCT to H level and then at time t5 sets the signal PCT to L level. Accordingly, the capacitive elements CTp1 and CTm1 hold the signal output from the differential amplifier 80. Also, the capacitive elements CTp2 and CTm2 hold the signal output from the differential amplifier 81.

In the period from time t6 to time t7, the horizontal scan circuit 30 sequentially scans the capacitive elements CTm and capacitive elements CTp in each column. The switch 200-1, switch 201-1, switch 200-2, and switch 201-2, are simultaneously controlled to a conducting state in the imaging device according to the present embodiment. Accordingly, the period in which the capacitive element CTp1 and capacitive element CTm1 output signals to the output amplifier 400-1, and the period in which the capacitive element CTp2 and capacitive element CTm2 output signals to the output amplifier 400-2, can be made to agree. Accordingly, the horizontal scanning period can be reduced in the imaging device according to the present embodiment, as compared to the imaging device according to the first embodiment.

At time t7, the vertical scan circuit 2 sets the signal PSEL1 to L level.

At time t8, the vertical scan circuit 2 sets the signal PRES to H level. Accordingly, the potentials of the floating diffusion capacitance 13-5, floating diffusion capacitance 13-6, floating diffusion capacitance 13-7, and floating diffusion capacitance 13-8, are reset. The vertical scan circuit 2 sets the signal PSEL2 to H level, thus controlling the transistors 18 of the pixels 100 to a conducting state. Thus, the transistor 15-5 outputs a signal to the vertical signal line 51-1 via the transistor 18-5. Also, the transistor 15-6 outputs a signal to the vertical signal line 51-2 via the transistor 18-6. Further, the transistor 15-7 outputs a signal to the vertical signal line 50-1 via the transistor 18-7, and the transistor 15-8 outputs a signal to the vertical signal line 50-2 via the transistor 18-8.

At time t9, the vertical scan circuit 2 sets the signal PRES to L level. This cancels the resetting of the potential of the floating diffusion capacitance 13-5, floating diffusion capacitance 13-6, floating diffusion capacitance 13-7, and floating diffusion capacitance 13-8.

At time t10, the vertical scan circuit 2 sets the signal PTX2 to H level, and the at time t11 sets the signal PTX2 to L level. Accordingly, the transistor 17-7 of the pixel 100-7 outputs a photogenerated signal to the vertical signal line 51-1. Also, the transistor 17-8 of the pixel 100-8 outputs a photogenerated signal to the vertical signal line 51-2. Here, the pixel 100-5 and pixel 100-6 are each the first pixel outputting reference signals. On the other hand, the pixel 100-7 and pixel 100-8 are each the second pixel outputting photogenerated signals. Also here, the vertical signal line 51-1 and vertical signal line 51-2 are the first vertical signal line where reference signals are input from each of the pixel 100-5 and pixel 100-6 which are the first pixel. The vertical signal line 50-1 and vertical signal line 50-2 are the second vertical signal line where photogenerated signals are input from each of the pixel 100-7 and pixel 100-8 which are the second pixel.

The differential amplifier 80 outputs a signal obtained by amplifying the signal of difference between the photogenerated signal input from the pixel 100-7 and the reference signal input from the pixel 100-6. Also, the differential amplifier 81 outputs a signal obtained by amplifying the signal of difference between the photogenerated signal input from the pixel 100-8 and the reference signal input from the pixel 100-5.

The operations at time t12 and time t13 are the same as the operations at time t4 and time t5, respectively.

The operations at time t14 and time t15 are the same as the operations at time t6 and time t7, respectively.

The same advantages as those of the first embodiment can be yielded by the imaging device according to the present embodiment as well. Further, providing the two vertical signal lines 50 and 51 enables photogenerated signals from two adjacent columns of pixels 100 to be read out faster than in the imaging device according to the first embodiment.

The imaging device according to the present embodiment has multiple output amplifiers 400-1 and 400-2. Accordingly, the periods at which the signals based on photogenerated signals of the two columns of pixels 100 are externally output can be made to agree in the imaging device according to the present embodiment. Thus, the period for external output of signals based on photogenerated signal from the multiple columns of pixels 100 from the imaging device can be reduced.

Note that while two vertical signal lines are provided to one column of pixels 100 in the present embodiment, an even greater number of vertical signal lines may be provided. Also, while the imaging device according to the present embodiment is described as having two output amplifiers 400, an even greater number of output amplifiers 400 may be provided.

Figure 7:
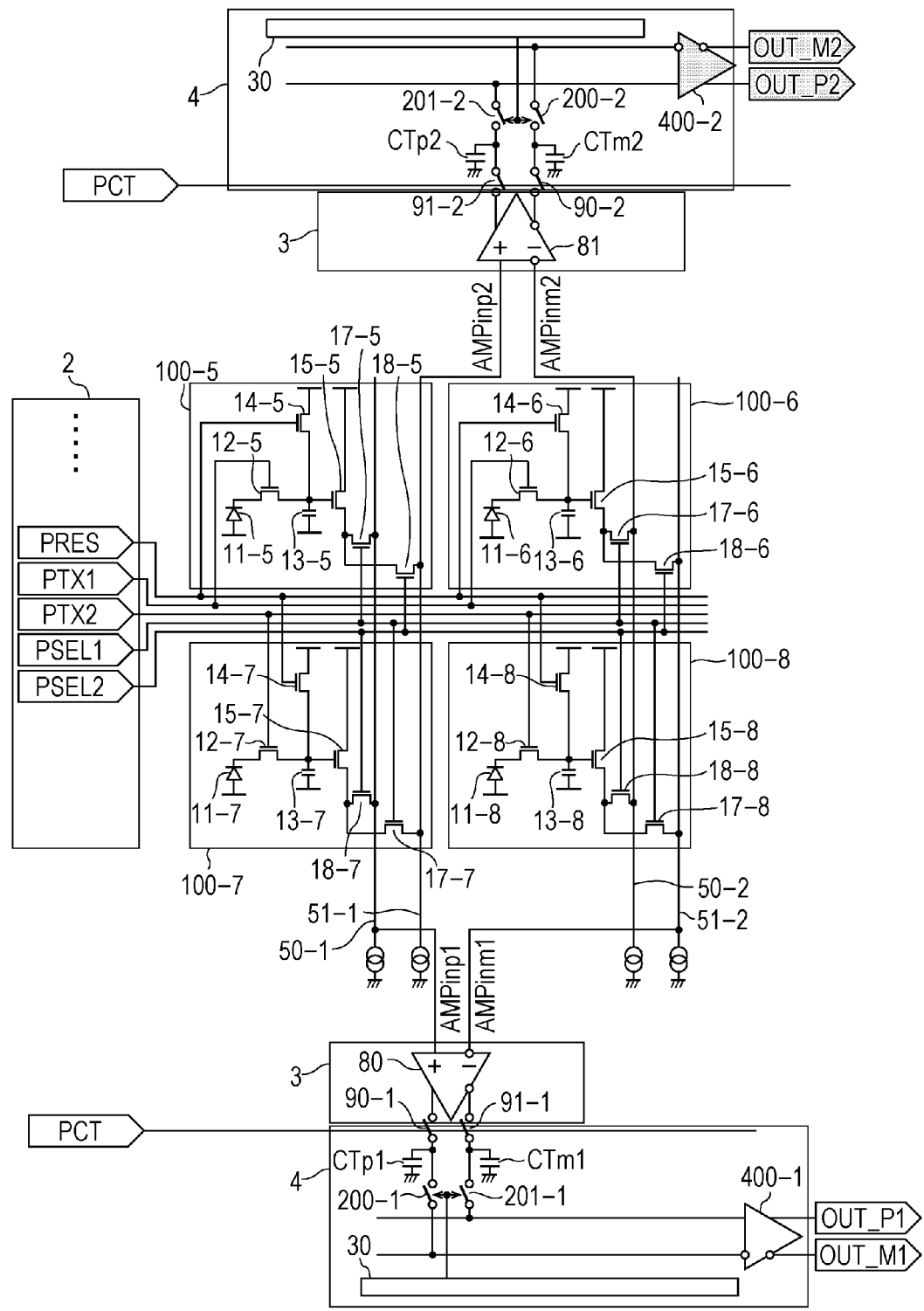
FIG. 7 is a diagram illustrating an example of the configuration of the imaging device.

FIG. 7 illustrates another example of the present embodiment. The imaging device in FIG. 7 has the differential amplifier 80 and differential amplifier 81 disposed across the imaging region 1 where the pixels 100 are provided. The imaging device illustrated in FIG. 5 needs the differential amplifiers 80 and 81 for two columns to be provided corresponding to two columns of pixels 100. In this configuration, there may not be enough space for the two columns of differential amplifiers 80 and 81 if the width of the two columns of pixels 100 is formed narrower due to an increase in the number of pixels of the imaging device. On the other hand, the imaging device illustrated in FIG. 7 enables the differential amplifier 80 and differential amplifier 81 to be disposed within width of one column worth of the differential amplifier 80 corresponding to width of two columns worth of the pixels 100. Thus, the imaging device in FIG. 7 can handled reduction in width of the two columns of pixels 100 due to an increase in the number of pixels of the imaging device, as compared to the imaging device illustrated in FIG. 5.

Third Embodiment

A third embodiment will now be described. Description of the imaging device according to the present embodiment will center on differences from the second embodiment. FIG. 8 is a diagram illustrating the configuration of the imaging device according to the present embodiment.

Description has been made with regard to the second embodiment that the signal PTX1 is supplied in common to the pixel 100-5 and pixel 100-6 in the same row, and that the signal PTX2 is supplied in common to the pixel 100-7 and pixel 100-8 in the same row. In the present embodiment, the signal PTX1 is supplied in common to a pixel 100-9 and a pixel 100-11 in the same column, and the signal PTX2 is supplied in common to a pixel 100-10 and a pixel 100-12 in the same row.

The configuration of each pixel 100 in the imaging device illustrated in FIG. 8 is the same as the configuration of each pixel 100 in the second embodiment. The difference signal generating unit 3 and horizontal transfer unit 4 according to the present embodiment have the same configuration as that illustrated in FIG. 5 according to the second embodiment. In the present embodiment, the pixels 100 which output photogenerated signals and the pixels 100 which output reference signals for obtaining difference as to the photogenerated signals are provided at the same row. The operations of the image forming device illustrated in FIG. 8 are the same as the operations described with reference to FIG. 6 according to the second embodiment.

At time t5 in FIG. 6, the capacitive elements CTp1 and CTm1 of the imaging device according to the present embodiment hold a signal obtained by the differential amplifier 80 having amplified a signal of difference between the photogenerated signal output by the pixel 100-9 and the reference signal output by the pixel 100-10. Also at the same time, the capacitive elements CTp2 and CTm2 hold a signal obtained by the differential amplifier 81 having amplified a signal of difference between the photogenerated signal output by the pixel 100-11 and the reference signal output by the pixel 100-12.

Also, at time t13 in FIG. 6, the capacitive elements CTp1 and CTm1 of the imaging device according to the present embodiment hold a signal obtained by the differential amplifier 80 having amplified a signal of difference between the photogenerated signal output by the pixel 100-10 and the reference signal output by the pixel 100-9. Also at the same time, the capacitive elements CTp2 and CTm2 hold a signal obtained by the differential amplifier 81 having amplified a signal of difference between the photogenerated signal output by the pixel 100-12 and the reference signal output by the pixel 100-11.

The imaging device according to the present embodiment also can yield the same advantages as the imaging device according to the second embodiment. Also, the imaging device according to the present embodiment can assume the configuration of the difference signal generating unit 3 and horizontal transfer unit 4 described with reference to FIG. 7 regarding the second embodiment.

Fourth Embodiment

A fourth embodiment will now be described. Description of the imaging device according to the present embodiment will center on differences from the second embodiment. The pixels 100 belonging to the first row in the imaging device according to the present embodiment output photogenerated signals at the same timing. The second row of pixels 100 which have output photogenerated signals prior to the first row then output reference signals input to the difference signal generating unit 3, at the same timing as the photogenerated signals.

FIG. 9 is a diagram illustrating the configuration of the imaging device according to the present embodiment. Multiple pixels 110 are arrayed in a matrix in the imaging region 1. The multiple pixels 110 in FIG. 9 are indicated by suffixes. Each of the multiple pixels 110 has a photodiode 111, a transistor 112, a floating diffusion capacitance 113, a transistor 114, a transistor 115, a transistor 117, and a transistor 118. Members of the pixels 110 are denoted with suffixes corresponding to the suffix of the relevant pixels 110 in FIG. 9. Also in FIG. 9, signals which the vertical scan circuit 2 outputs are indicated by a suffix, with the denotation of the signal output to the n'th pixel row being followed by [n]. The difference signal generating unit 3 and horizontal transfer unit 4 illustrated in FIG. 9 are of the same configuration as described with reference to FIG. 5 in the second embodiment.

The photodiode 111-1 is a photoelectric conversion unit which accumulates charge based on incident light. The transistor 112-1 transfers charge accumulated in the photodiode 111-1 to the floating diffusion capacitance 113-1 when the signal PTX[1] input from the vertical scan circuit 2 is at H level. The input node of the transistor 115-1 is electrically connected to the floating diffusion capacitance 113-1. The transistor 115-1 is electrically connected to the non-inversion input node of the differential amplifier 80 via a transistor 117-1 and a vertical signal line 500-1.

The transistor 117-1 outputs the signal output from the transistor 115-1 to the vertical signal line 500-1 when the signal PSEL1[1] input from the vertical scan circuit 2 goes to H level. The transistor 118-1 outputs the signal output from the transistor 115-1 to the vertical signal line 501-1 when the signal PSEL2[1] input from the vertical scan circuit 2 goes to H level. The transistor 114-1 resets the potential of the floating diffusion capacitance 113-1 to that based on the power source voltage VDD when the signal PRES[1] input from the vertical scan circuit 2 goes to H level.

Note that in the imaging device in FIG. 9, the signal PRES, signal PTX, signal PSEL1, and signal PSEL2, output from the vertical scan circuit 2, are the common signals to the pixels 110 of the same row. Accordingly, the operations of the pixel 110-2 are the same as the operations of the pixel 110-1.

Figure 10:
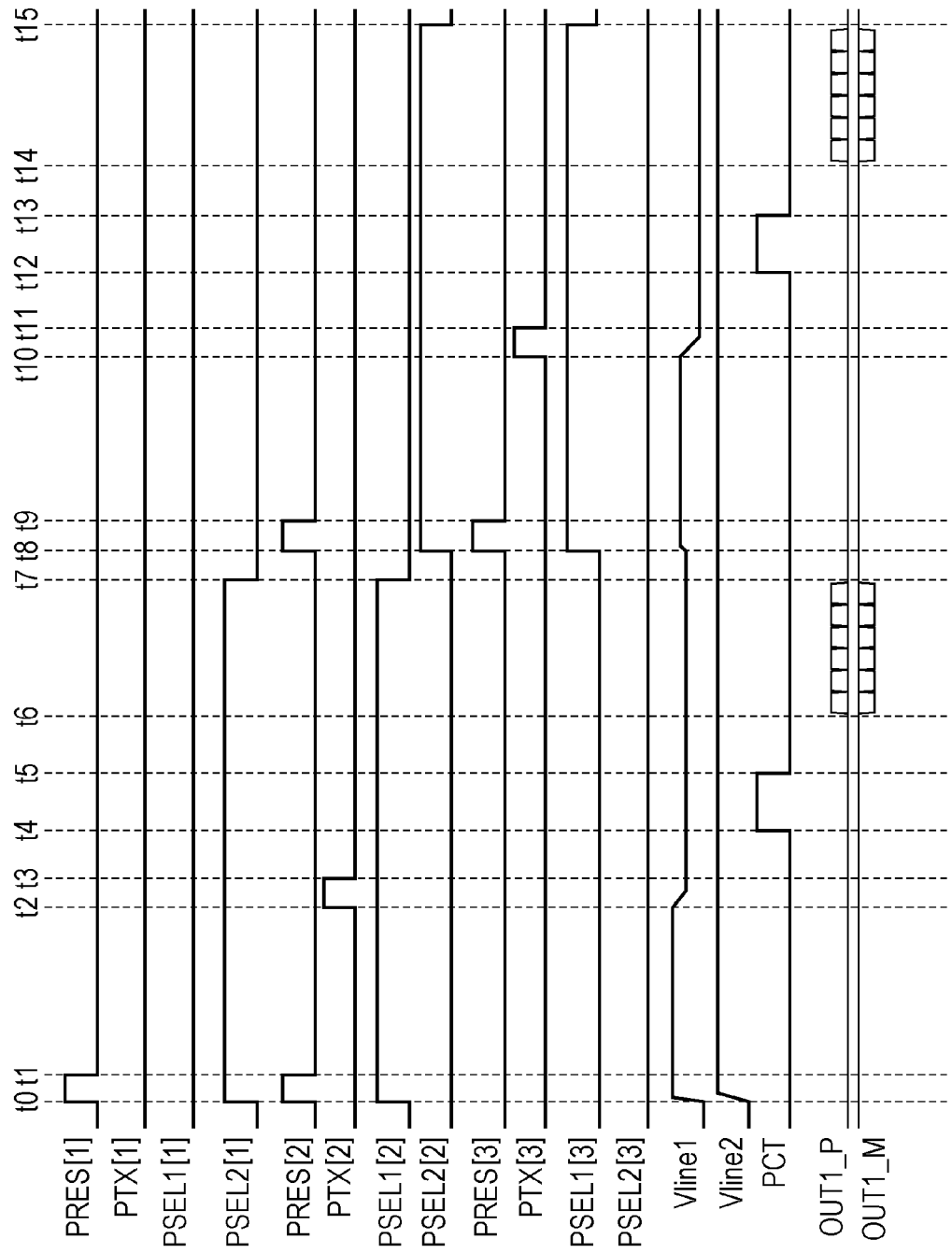
FIG. 10 is a diagram illustrating an example of operation of the imaging device.

FIG. 10 is a timing chart illustrating the operations of the imaging device in FIG. 9. Of the pixels 110 illustrated in FIG. 9, the pixels 110 belonging to the 1st row have already completed output of photogenerated signals. Out of the pixels 110 illustrated in FIG. 9, the pixels 110 belonging to the 2nd row and 3rd row output photogenerated signals in the timing chart in FIG. 10.

At time t0 the vertical scan circuit 2 sets the signal PRES[1] to H level. This resets the potential of the floating diffusion capacitances 113 of the 1st row of pixels 110. At the same time, the vertical scan circuit 2 sets the signal PRES[2] to H level. This resets the potential of the floating diffusion capacitances 113 of the 2nd row of pixels 110.

Also, at time t0 the vertical scan circuit 2 sets the signal SEL2[1] to H level. Thus, the transistors 115 of the 1st row of pixels 110 output signals to the vertical signal line 501-1 and vertical signal line 501-2. At the same time, the vertical scan circuit 2 sets the signal PSEL1[2] to H level. Thus, the transistors 115 of the 2nd row of pixels 110 output signals to the vertical signal line 500-1 and vertical signal line 500-2.

At time t1, the vertical scan circuit 2 sets the signal PRES[1] and the signal PRES[2] to L level. This cancels the resetting of the floating diffusion capacitances 113 of the 1st row of pixels 110. The transistors 115 of the 1st row of pixels 110 output reference signals to the vertical signal line 501-1 and vertical signal line 501-2.

At time t2, the vertical scan circuit 2 sets the signal PTX[2] to H level, following which at t3, to L level. Accordingly, the transistors 112 of the 2nd row of pixels 110 transfer the charges accumulated in the photodiodes 111 to the floating diffusion capacitances 113. Thus, photogenerated signals of the 2nd row of pixels 110 are transferred to the vertical signal line 500-1 and vertical signal line 500-2. Note that here, the pixel 110-1 and the pixel 110-2 belonging to the first row each are the first pixel which outputs a reference signal. On the other hand, the pixel 110-3 and the pixel 110-4 belonging to the second row each are the second pixel which outputs a photogenerated signal. Also here, the vertical signal line 501-1 and vertical signal line 501-2 are each the first vertical signal line which receives input of the reference signal from each of the pixel 110-1 and the pixel 110-2 which are the first pixel. The vertical signal line 500-1 and vertical signal line 500-2 are each the second vertical signal line which receives input of the photogenerated signal from each of the pixel 110-3 and the pixel 110-4 which are the second pixel.

The differential amplifier 80 outputs a signal obtained by amplifying the difference between the photogenerated signal input from the pixel 110-3, which is one of the pixels 110 of the 2nd row, and the reference signal input from the pixel 110-1, which is one of the pixels 110 of the 1st row. The differential amplifier 81 outputs a signal obtained by amplifying the difference between the photogenerated signal input from the pixel 110-4, which is one of the pixels 110 of the 2nd row, and the reference signal input from the pixel 110-2, which is one of the pixels 110 of the 1st row.

The operations regarding the signal PCT and horizontal transfer unit 4 from time t4 to time t7 is the same as the operations of time t4 to time t7 described with reference to FIG. 6 in the second embodiment. Accordingly, the imaging device can output signals obtained by amplifying the difference between the photogenerated signals of the pixels 110 of the 2nd row, and the reference signals of the pixels 110 of the 1st row.

At time t7, the vertical scan circuit 2 sets the signal PSEL2[1] and the signal PSEL1[2] to L level.

At time t8, the vertical scan circuit 2 sets the signal PRES[2] to H level. This resets the potential of the floating diffusion capacitances 113 of the pixels 110 of the 2nd row. At the same time, the vertical scan circuit 2 sets the signal PRES[3] to H level. This resets the potential of the floating diffusion capacitances 113 of the pixels 110 of the 3rd row.

Also at time t8, the vertical scan circuit 2 sets the signal PSEL2[2] to H level. Accordingly, the transistors 115 of the pixels 110 of the 2nd row output signals to the vertical signal line 501-1 and vertical signal line 501-2. Also at the same time, the vertical scan circuit 2 sets the signal PSEL1[3] to H level. Accordingly, the transistors 115 of the pixels 110 of the 3rd row output signals to the vertical signal line 500-1 and vertical signal line 500-2.

At time t9, the vertical scan circuit 2 sets the signal PRES[2] and the signal PRES[3] to L level. This cancels the resetting of the floating diffusion capacitances 113 of the pixels 110 of the 2nd row. The transistors 115 of the pixels 110 of the 2nd row output reference signals to the vertical signal line 501-1 and vertical signal line 501-2.

At time t10, the vertical scan circuit 2 sets the signal PTX[3] level, and at time t11 to L level. Accordingly, the transistors 112 of the pixels 110 of the 3rd row transfer the charges accumulated in the photodiodes 111 to the floating diffusion capacitances 113. Thus, the pixels 110 of the 3rd row output photogenerated signals to the vertical signal line 500-1 and vertical signal line 501-1. Note that here, the pixel 110-3 and pixel 110-4 belonging to the 2nd row are each the first pixel which outputs reference signals. On the other hand, the pixel 110-5 and pixel 110-6 belonging to the 3rd row are each the second pixel which outputs photogenerated signals. Also note that here, the vertical signal line 501-1 and the vertical signal line 501-2 are the first vertical signal line which receives reference signals from each of the pixel 110-3 and pixel 110-4 which are the first pixel. Also, the vertical signal line 500-1 and the vertical signal line 500-2 are the second vertical signal line which receives the photogenerated signals from each of the pixel 110-5 and pixel 110-6 which are the second pixel.

The differential amplifier 80 outputs a signal obtained by amplifying the difference between the photogenerated signal input from the pixel 110-5 which is one of the pixels 110 of the 3rd row, and the reference signal input from the pixel 110-3 which is one of the pixels 110 of the 2nd row. The differential amplifier 81 outputs a signal obtained by amplifying the difference between the photogenerated signal input from the pixel 110-6 which is one of the pixels 110 of the 3rd row, and the reference signal input from the pixel 110-4 which is one of the pixels 110 of the 2nd row.

The operations regarding the signal PCT and horizontal transfer unit 4 from time t12 to time t15 is the same as the operations of time t4 to time t7. Accordingly, the imaging device according to the present embodiment can yield the same advantages as with the second embodiment.

An arrangement may be made wherein the difference between the photogenerated signals output from the pixels 110 of the 1st row and the reference signals output from the pixels 110 of the 2nd row is obtained. Also, an arrangement may be made wherein the difference between the photogenerated signals output from the pixels 110 of the 1st row and reference signals output from optical black pixels where the photodiodes 111 have been shielded, is obtained. In this case, the difference between the photogenerated signals output from the pixels 110 of the 1st row and reference signals output from optical black pixels where the pixels 110 have been shielded may be obtained before the process of obtaining the difference between the photogenerated signals of the pixels 110 of the 2nd row and the reference signals of the pixels 110 of the 1st row. An arrangement may be made where the difference between the photogenerated signals output by the pixels 110 of the 1st row and reference signals output by reference pixels which output a constant signal, the reference pixels being provided outside of the imaging region 1 where no photodiodes 111 are disposed. In this case, the difference between the photogenerated signals output from the pixels 110 of the 1st row and reference signals output from the reference pixels may be obtained before the process of obtaining the difference between the photogenerated signals of the pixels 110 of the 2nd row and the reference signals of the pixels 110 of the 1st row. The optical black pixels or reference pixels are preferably provided near the pixels 110 of the 1st row.

Fifth Embodiment

Figure 11:
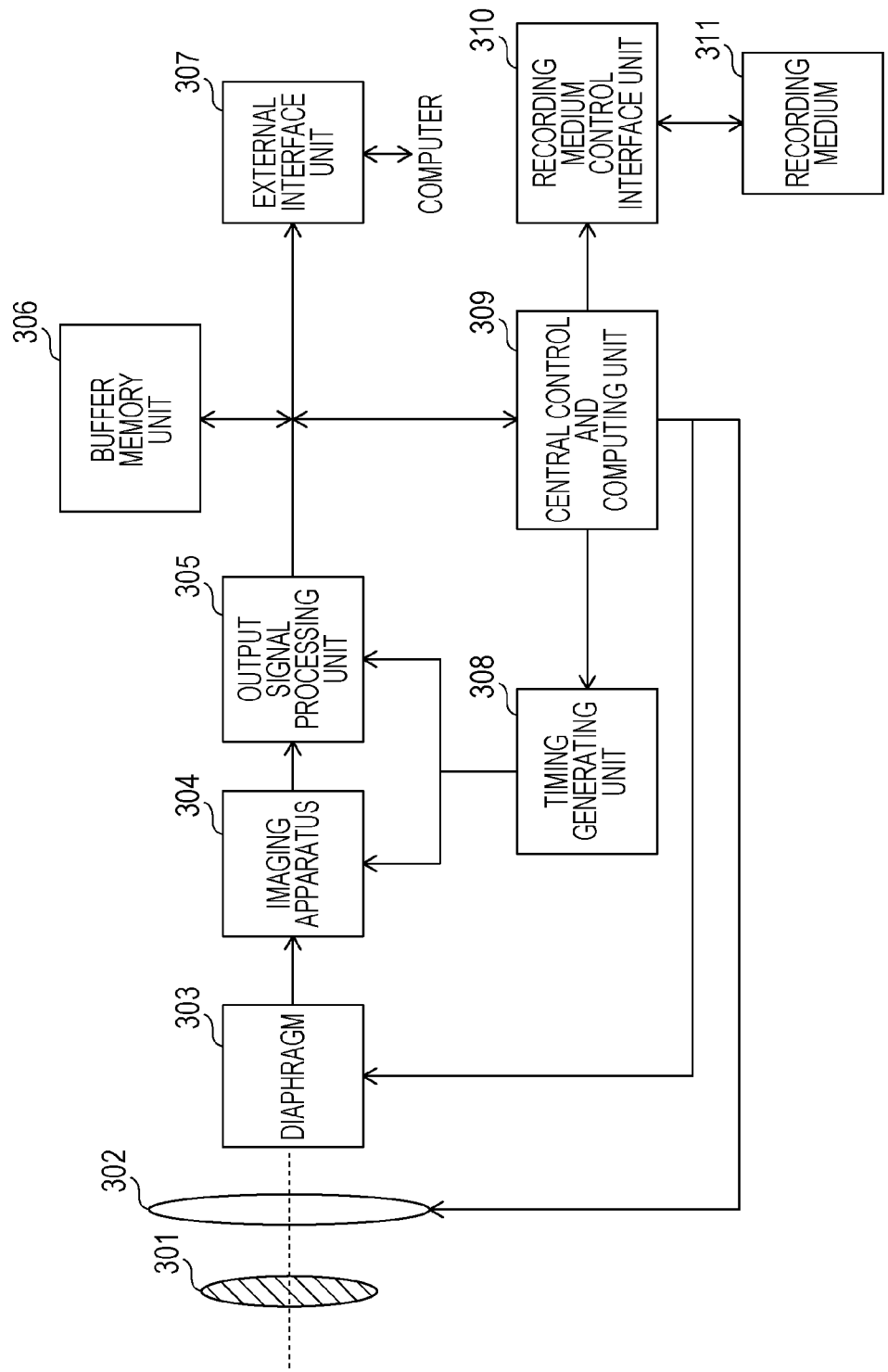
FIG. 11 is a diagram illustrating an example of a configuration of an imaging system.

An embodiment where the imaging device described in the first through fourth embodiments has been applied to an imaging system will be described. Examples of an imaging system include a digital still camera, digital camcorder, monitoring camera, and so forth. FIG. 11 is a block diagram illustrating a case of applying the imaging device to a digital still camera, as an example of an imaging system.

The imaging system illustrated in FIG. 11 includes a lens 302 to focus an optical image of an object on an imaging device 304, a barrier 301 to protect the lens 302, and a diaphragm to vary the amount of light passing through the lens 302. The imaging system also includes an output signal processing unit 305 to perform processing of output signals output from the imaging device 304.

The output signal processing unit 305 has a digital signal processing unit which performs operations of various types of correction and compression as necessary, on the signals output from the imaging device 304, and outputs the signals.

The imaging system also includes a buffer memory unit 306 to temporarily store image data, and a recording medium control interface unit 310 to record to and read from a recording medium 311. The recording medium 311 is a detachable recording medium such as semiconductor memory or the like, and is used for recording/reading of image data. The imaging system also includes an external interface unit 307 for communication with an external computer or the like, an overall control/calculation unit 309 which performs various types of calculates and controls the overall digital still camera, and the imaging device 304. The imaging system further includes a timing generating unit 308 which outputs various types of timing signals to the output signal processing unit 305. Note that timing signals may be externally output, and that it is sufficient for the imaging system to include at least the imaging device 304 and the output signal processing unit 305 which processes output signals output from the imaging device 304.

Thus, the imaging system according to the present embodiment can perform imaging operations applying the imaging device 304.

According to the disclosure, an imaging device can be provided which outputs signals obtained by removing noise components from signals output by effective pixels with high accuracy.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-267144, filed Dec. 25, 2013, which is hereby incorporated by reference herein in its entirety.

What is claimed is:

1. An imaging device comprising:
    pixels arranged in rows and columns, each of which has an amplifying transistor;
    differential amplifiers, each differential amplifier having a first input node and a second input node; and
    a first signal line and a second signal line,
    wherein the amplifying transistor of a first pixel, which is one of the pixels, is connected to the first signal line,
    the amplifying transistor of a second pixel, which is another one of the pixels, is connected to the second signal line,
    the first signal line is connected to the first input node via a first switch,
    the first signal line is connected to the second input node via a second switch,
    the second signal line is connected to the first input node via a third switch, and
    the second signal line is connected to the second input node via a fourth switch,
    wherein, as a result of switching on of the first switch and the fourth switch, the differential amplifier outputs a signal based on a difference between a reference signal of the first pixel input to the first input node and a photogenerated signal of the second pixel input to the second input node, and
    wherein, as a result of switching on of the second switch and the third switch, the differential amplifier outputs a signal based on a difference between a reference signal of the second pixel input to the first input node and a photogenerated signal of the first pixel input to the second input node.

2. The imaging device according to claim 1,
    wherein the amplifying transistor included in each of the first pixel and the second pixel outputs the photogenerated signal and the reference signal,
    and wherein each amplifying transistor of the first pixel and the second pixel is electrically connected to a common power source wiring.

3. The imaging device according to claim 1, further comprising
    a vertical scan circuit configured to scan the pixels,
    wherein the vertical scan circuit so selects the first pixel and the second pixel at the same timing that a part of a period where the reference signal of one of the first pixel and the second pixel is input to the each differential amplifier overlaps a part of a period where the photogenerated signal of the other of the first pixel and the second pixel is input to the each differential amplifier.

4. The imaging device according to claim 1, wherein the first pixel and the second pixel each belong to the same row.

5. The imaging device according to claim 1, wherein the first pixel and the second pixel each belong to a different row.

6. The imaging device according to claim 1 wherein a number of pixels which are arranged between the first pixel and the second pixel, is ten or less.

7. The imaging device according to claim 1, wherein the signal based on the difference between the reference signal and the photogenerated signal, which the each differential amplifier outputs, is a signal obtained by the each differential amplifier amplifying a signal of difference between the reference signal and the photogenerated signal.

8. The imaging device according to claim 1,
    wherein, in a period, the amplifying transistor of the first pixel is not connected to the second input node, and the amplifying transistor of the second pixel is not connected to the first input node.

9. An imaging system comprising:
    an imaging device; and
    an output signal processing unit configured to process a signal output by the imaging device,
    wherein the imaging device comprises:
    pixels arranged in rows and columns, each of which has an amplifying transistor; a plurality of difference signal generating units, each differential signal generating unit including a differential amplifier having a first input node and a second input node; and
    a first signal line and a second signal line,
    wherein the amplifying transistor of a first pixel, which is one of the pixels, is connected to the first signal line,
    the amplifying transistor of a second pixel, which is another one of the pixels, is connected to the second signal line,
    the first signal line is connected to the first input node via a first switch,
    the first signal line is connected to the second input node via a second switch,
    the second signal line is connected to the first input node via a third switch, and
    the second signal line is connected to the second input node via a fourth switch,
    wherein, as a result of switching on of the first switch and the fourth switch, the differential amplifier outputs a signal based on a difference between a reference signal of the first pixel input to the first input node and a photogenerated signal of the second pixel input to the second input node, and
    wherein, as a result of switching on of the second switch and the third switch, the differential amplifier outputs a signal based on a difference between a reference signal of the second pixel input to the first input node and a photogenerated signal of the first pixel input to the second input node.

* * * * *